(12) United States Patent
Hui

(10) Patent No.: US 7,254,997 B1
(45) Date of Patent: Aug. 14, 2007

(54) ANTI-STEAL TIRE PRESSURE MONITORING APPARATUS

(76) Inventor: David Hui, 10-1 Fl., No. 223, Nanking East Road, Sec. 5, Taipei (TW)

( * ) Notice: Subject to any disclaimer, the term of this patent is extended or adjusted under 35 U.S.C. 154(b) by 0 days.

(21) Appl. No.: 11/441,562

(22) Filed: May 30, 2006

(51) Int. Cl.
*B60C 23/02* (2006.01)

(52) U.S. Cl. ........................................ 73/146.8; 73/146
(58) Field of Classification Search ........ 73/146–146.8
See application file for complete search history.

(56) References Cited

U.S. PATENT DOCUMENTS

| | | | | |
|---|---|---|---|---|
| 5,307,846 A | * | 5/1994 | Heinemann | 141/1 |
| 6,918,291 B2 | * | 7/2005 | Durr et al. | 73/146.2 |
| 7,215,243 B2 | * | 5/2007 | Rimkus et al. | 340/442 |

* cited by examiner

*Primary Examiner*—Edward Lefkowitz
*Assistant Examiner*—Jermaine Jenkins

(57) ABSTRACT

An anti-steal tire pressure monitoring apparatus includes: a tire valve; a tire pressure sensor and transmitter connected with a tire inflation valve of the tire valve; an inner cap having the tire pressure sensor and transmitter encased in the inner cap and engaged with a valve seat of the tire valve; and an outer sleeve free rotatably engaged with the inner cap; whereby upon tightly screwing of the inner cap with the valve seat of the tire valve to depress the inflation valve to allow the air entering the sensor for detecting the tire pressure, any rotation (counter rotation) of the outer sleeve trying to unscrew the inner cap will be ineffective, since the outer sleeve is free rotatably engageable with the inner cap, so as to safely "lock" the inner cap and the tire pressure sensor and transmitter on the tire valve without being stolen or removed from the tire valve.

11 Claims, 4 Drawing Sheets

ANTI-STEAL TIRE PRESSURE
MONITORING APPARATUS

BACKGROUND OF THE INVENTION

U.S. Pat. No. 6,993,962 disclosed an electronic wireless tire pressure monitoring apparatus installed on a tire inflation valve for a direct signal transmission and reliable detection of tire pressure.

However, such a prior art has the following drawbacks:
1. The pressure detector (100) is screwed to a tire valve without being provided with any locking mechanism. Such a pressure detector may be easily stolen.
2. Once the detector (100) is stolen, the inflation valve of the tire valve may be easily contaminated by any external dirts, dust or pollutants; and may even by clogged by external objects to thereby influence the normal inflation or deflation of a car tire.
3. The detector (100) is provided for replacing the conventional cap covered on the tire inflation valve. Once the detector is stolen or removed from the tire valve, the inflation valve may be intentionally or accidentally operated by any intruder or child to deflate the air in the tire pressure to thereby affect the car driving safety.

The present inventor has found the drawbacks of the prior art and invented the present anti-steal tire pressure monitoring apparatus.

SUMMARY OF THE INVENTION

The object of the present invention is to provide an anti-steal tire pressure monitoring apparatus including: a tire valve; a tire pressure sensor and transmitter connected with a tire inflation valve of the tire valve; an inner cap having the tire pressure sensor and transmitter encased in the inner cap and engaged with a valve seat of the tire valve; and an outer sleeve free rotatably engaged with the inner cap; whereby upon tightly screwing of the inner cap with the valve seat of the tire valve to depress the inflation valve to allow the air entering the sensor for detecting the tire pressure, any rotation (counter rotation) of the outer sleeve trying to unscrew the inner cap will be ineffective, since the outer sleeve is free rotatably engageable with the inner cap, so as to safely "lock" the inner cap and the tire pressure sensor and transmitter on the tire valve without being stolen or removed from the tire valve.

DETAILED DESCRIPTION

Figure 1:
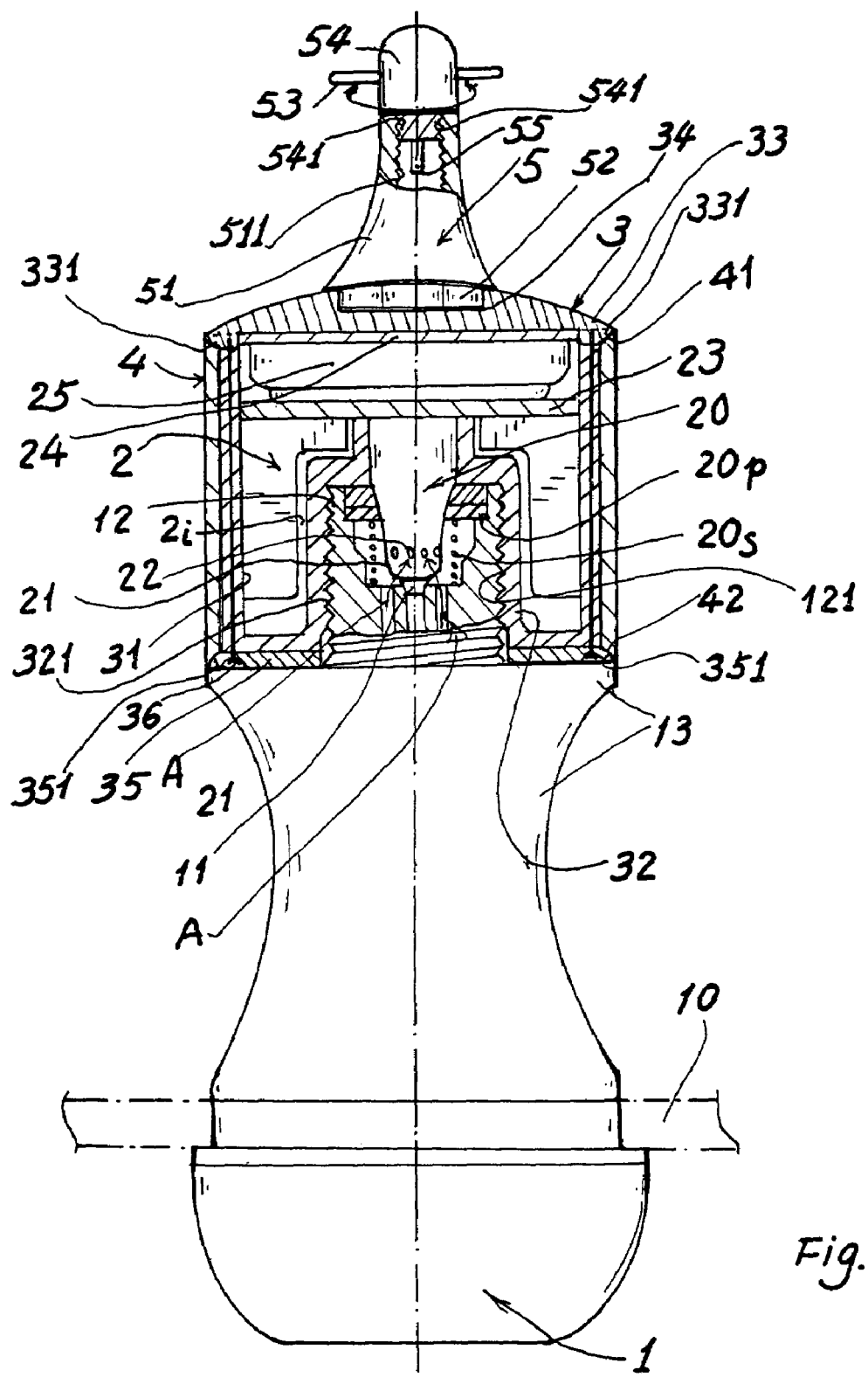
FIG. 1 is a sectional drawing of the present invention.
Figure 2:
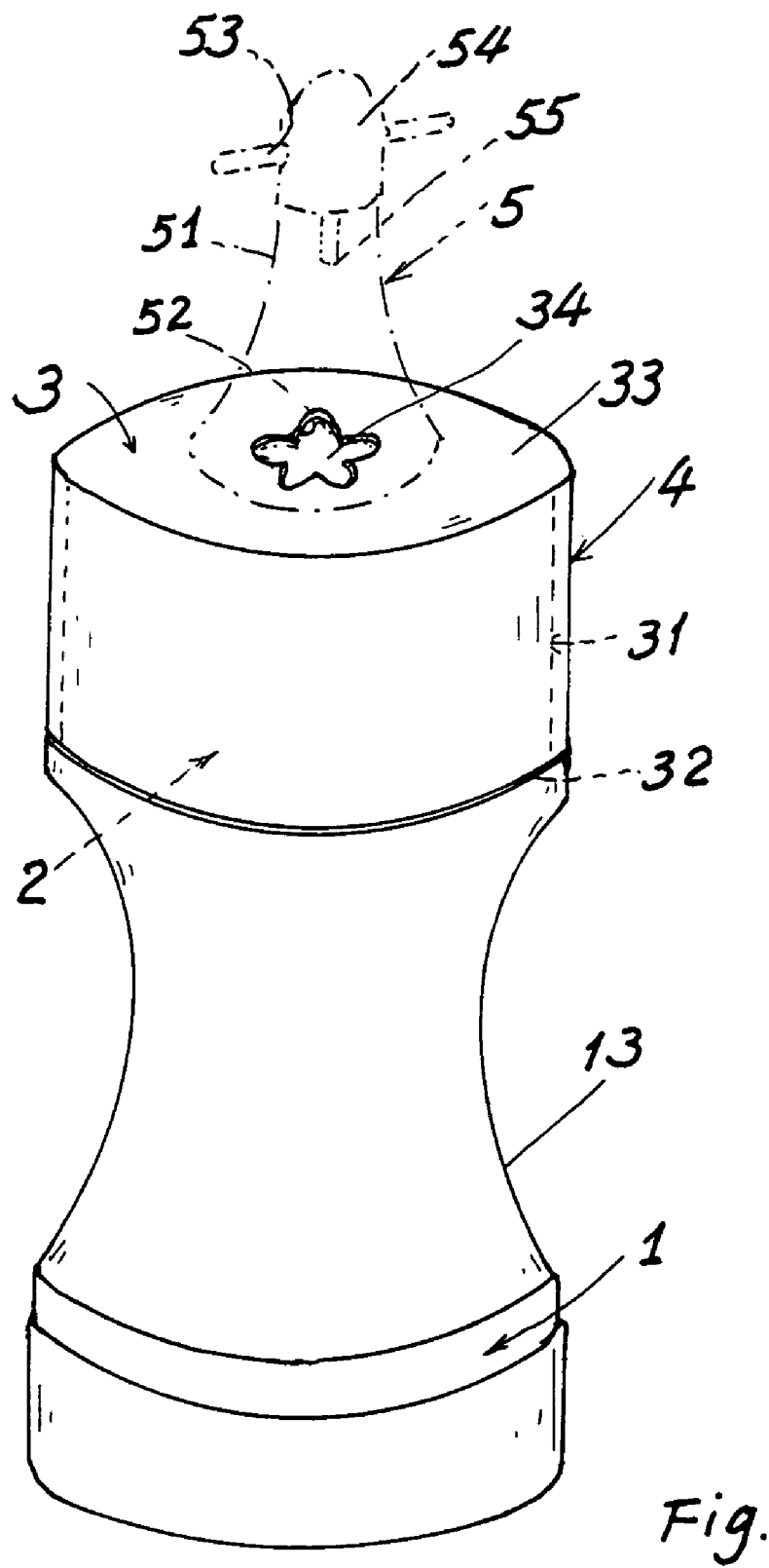
FIG. 2 is a perspective view of the present invention.

As shown in FIGS. 1~4, the present invention comprises: a tire valve 1 mounted on a wheel rim 10 of a car tire; a tire pressure sensor and transmitter means 2 connected with the tire valve 1; an inner cap 3 having the tire pressure sensor and transmitter means 2 encased in the inner cap 3 and screwed to the tire valve 1; an outer sleeve 4 free rotatably engaged with the inner cap 3 having zero or low friction in between the inner cap 3 and the outer sleeve 4; and a key device 5 for unscrewing the inner cap 3 from the tire valve 1 or for screwing the cap 3 to the valve 1.

The outré sleeve 4 has an outside diameter generally equal to an outside diameter of an outer protective cylinder 13 (or its upper portion) fixed and disposed around the tire valve 1, thereby providing no space or recess portion for grasping the inner cap 3 by an intruder trying to unlock the cap 3, thereby ensuring a safe locking of the inner cap 3 on the tire valve 1.

The tire pressure sensor and transmitter means 2 includes: a sensor 20 having an actuator 21 operatively depressing an inflation valve 11 of the tire valve 1 for leading air from a car (or truck) tire into the sensor 20 through a plurality of perforations 22 formed through the actuator 21 for sensing the tire pressure in the car tire, a transmitter 23 processing a tire pressure signal as sensed by the sensor 20 and remotely transmitting the signal to a tire pressure receiver (not shown) which may be provided in a car, through an antenna 24 which may be formed as a plate antenna as shown in FIG. 1, at least a battery or cell 25 stored in the inner cap 3 for powering the tire pressure sensor and transmitter means 2.

For saving space or volume, an electronic circuit or circuit board may be formed within an annular interior 2i defined in the inner cap 3 as shown in FIG. 1. Naturally, the structures, shapes or arrangements for accommodating the elements of the sensor and transmitter means 2 within the inner cap 3 are not limited in the present invention.

The actuator 21 of the sensor 20 includes a packing member 20p circumferentially formed on the actuator 20 to be well sealed on a valve seat 12 of the tire valve 1 when a female-threaded socket 32 of the inner cap 3 is engaged or screwed with a male-threaded portion 121 of the valve seat 12, and a tension spring (or a spring-like device) 20s resiliently retained in between the packing member 20p and a bottom portion of the valve seat 12 to normally urge the actuator 21 outwardly (or upwardly) to be slightly separated from the inflation valve 11 to prevent from air leakage from the car tire, except that the inner cap 3 is firmly fastened or screwed on the tire valve 1 by the key device 5.

That is to say that, when the actuator 21 is very very close to the inflation valve 11, a slight further depression of the actuator 21 on the inflation valve 11 may cause air leakage. However, due to the implementation of such a tension spring 20s normally resiliently urging the actuator 21 outwardly of upwardly, the inflation valve 11 will not be accidentally depressed to cause unexpected air leakage, unless a tightly screwing of the inner cap 3 on the valve seat 12, when adapted for actually detecting the tire pressure, for depressing the actuator 21 against the inflation valve 11 for opening the valve 11.

For detecting the tire pressure, the actuator 21 is acting upon the inflation valve 11 and the air A will enter the sensor 20 for sensing the tire pressure, of which the signal will be processed, transmitted by the transmitter 23 installed in the inner cap 3 and remotely transmitted outwardly through the antenna 24.

For maintenance or replacing battery or cell 25, the inner cap 3 may be uncovered, which will be described hereinafter.

The inner cap 3 includes: a cylindrical wall 31, a female-threaded socket 32 circumferentially connected to the cylindrical wall 31 to be screwed and engaged with the male-threaded portion 121 of the valve seat 12 of the tire valve 1, a top cover 33 secured on a top periphery of the cylindrical wall 31 having a key recess 34 recessed in an upper surface of the top cover 33 adapted to be engaged with a key device 5 for screwing the inner cap 2 with the tire valve 1 or for unscrewing the cap 2 from the valve 1, and a bottom cover 35 secured to a bottom periphery of the cylindrical wall 31 by a plurality of screws 36; with the outer sleeve 4 free rotatably engaged with the cylindrical wall 31, as rotatably slidably limited between the top cover 33 and the bottom cover 35.

Figure 3:
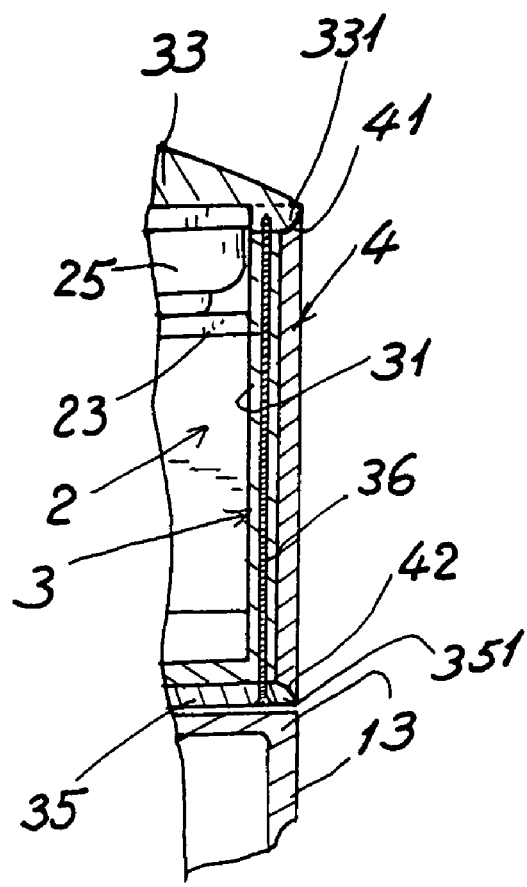
FIG. 3 is a partial sectional drawing showing the rotatable engagement of the outer sleeve with the inner cap of the present invention.
Figure 4:
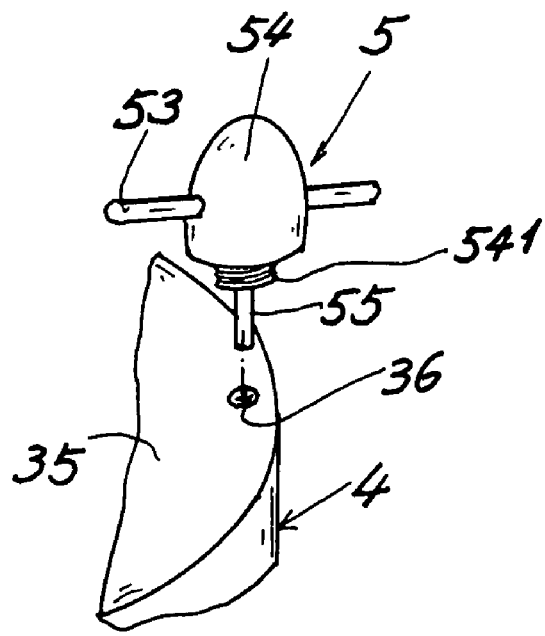
FIG. 4 shows a key device adapted for dismantling the screw from the bottom cover of the present invention.

The top cover 33 may also be secured to the wall 31 by the plurality of screws 36 as shown in FIGS. 1 and 3, or by other fastening methods.

As shown in FIG. 3, the outer sleeve 4 includes an upper groove 41 annularly formed in an upper rim of the sleeve 4 to be rotatably slidably engaged with an upper annular ring 331 circumferentially formed on the top cover 33, and a lower groove 42 annularly formed in a lower rim of the sleeve 4 to be rotatably slidably engaged with a bottom annular ring 351 circumferentially formed on the bottom cover 35; both the upper annular ring 331 of the top cover 33 and the lower annular ring 351 of the bottom cover 35 are slidably shielded by the upper rim and bottom rim of the sleeve 4 so that the intruder will have "no way" to grasp, hold or rotate the inner cap 3 as "concealed" within the outer sleeve 4, thereby safely "locking" the inner cap 3 and the sensor and transmitter means 2 on the valve 1.

When the intruder rotates the sleeve 4, trying to unlock or unscrew the sensor and transmitter means 2 from the tire valve 1, the outer sleeve 4 is free rotatably engaged with the inner cap 3 so that the inner cap 3 will not be unscrewed from the tire valve 1, unless using the key device 5 of the present invention for unlocking or unscrewing the inner cap 3 (including the sensor and transmitter means 2 encased in the cap 3) from the valve 1.

Therefore, the sensor and transmitter means 2 will be safely "locked" on the tire valve 1 for ensuring car safety and security.

The key device 5 includes: a stem 51 which may be formed as flared shape, a first key 52 formed on a bottom portion of the stem 51 and engaged with a key recess 34 as formed in the top cover 33 of the inner cap 3 for driving the top cover 33 and the inner cap 3 for locking or unlocking the inner cap 3 on or from the valve seat 12 of the tire valve 1, and a handle (or a pair of handles) 53 transversely formed on a knob 54 which is secured or formed on an upper portion of the stem 51 for rotating or driving the stem 51 for locking or unlocking operation.

The first key 52 may be formed as a plum flower protrusion or any other irregular-shaped protrusions protruding downwardly from the stem 51.

The key device 5 further includes a second key 55 which is protruded from a male-threaded adapter 541 formed on the knob 54 and provided for driving the screw 36 for fastening or unfastening the bottom cover 35 or the top cover 33 with or from the cylindrical wall 31 of the inner cap 3; with the male-threaded adapter 541 engaged with a female-threaded cavity 511 recessed in the stem 51 for normally storing the second key 55 within the female-threaded cavity 511 in the stem 51.

Other modifications may be made for implementing the keys 52, 55 in the key device 5.

Figure 5:
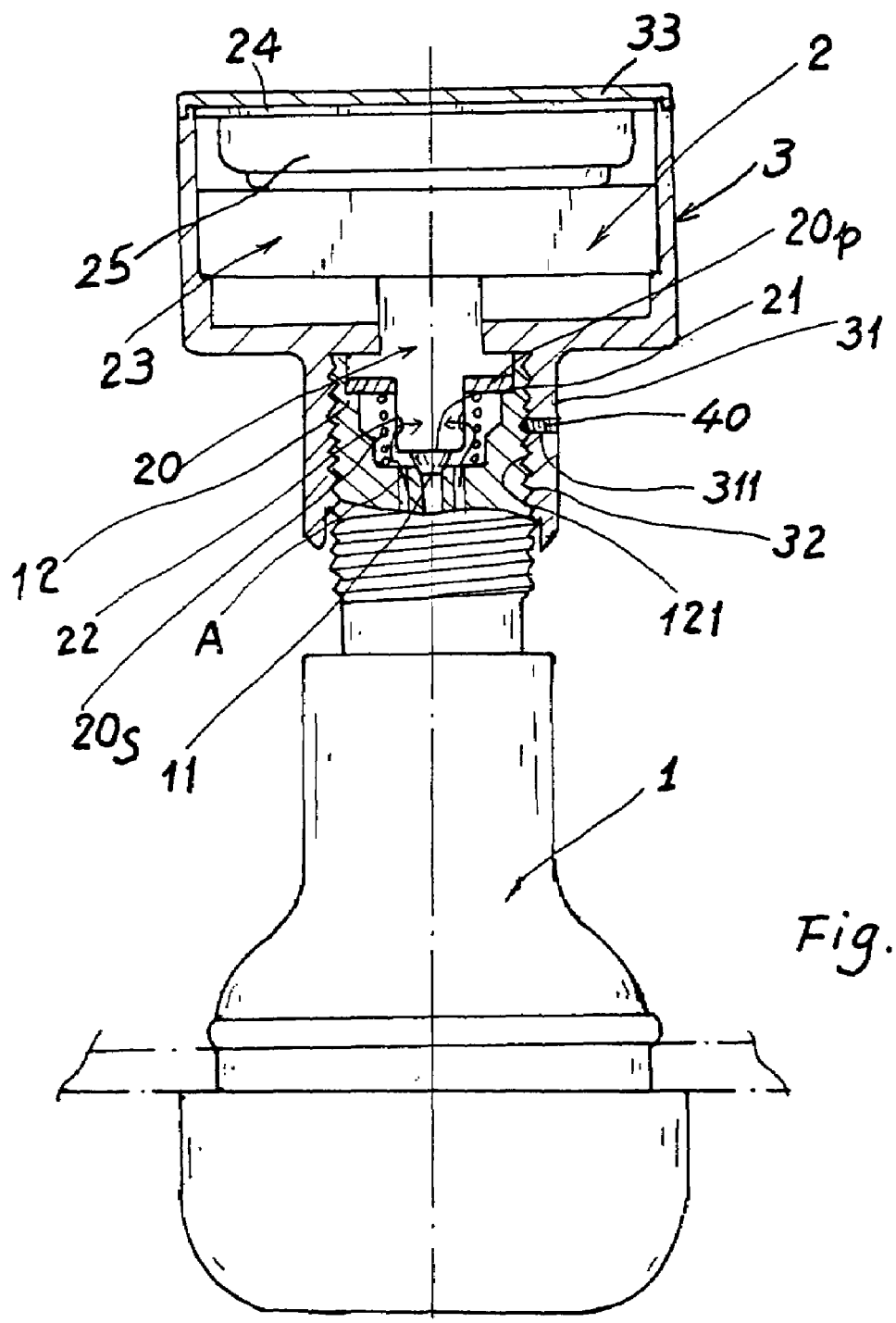
FIG. 5 is a sectional drawing of another preferred embodiment of the present invention.

Another preferred embodiment of the present invention is shown in FIG. 5 by modifying the inner cap 3 to include an upper enlarged cylinder portion and a lower neck portion; and by eliminating the outer sleeve 4.

A set screw 40 is rotatably engaged with a female-threaded screw hole 311 formed through the cylindrical wall 31 of the inner cap 3; whereby when locking the present invention, a tool (not shown) such as a driver is provided to screw the set screw 40 inwardly to be dogged with the female-threaded portion 121 of the valve seat 12 of the tire valve 1 for locking the inner cap 3 with the tire valve 1 to prevent from unexpected stealing or removal of the present invention from the tire valve 1. The set screw 40 may be formed as polygonal shape including hexagonal shape.

For removing the present invention such as for maintenance, the set screw 40 may be unscrewed to allow the disengagement of the inner cap 3 from the valve seat 12 of the tire valve 1. Even though the screw hole 311 may be found out by an intruder, it is however inconvenient for him by keeping a driver or tool ready on his hand for unscrewing the set screw 40. So, it still has a locking function basically.

The present invention may be further modified without departing from the spirit and scope of the present invention. For instance, the protective cylinder or cover 13 may be integrally formed with the tire valve 1 or may also be omitted.

I claim:

1. An anti-steal tire pressure monitoring apparatus comprising:
a tire valve mounted on a wheel rim of a car tire; a tire pressure sensor and transmitter means connected with the tire valve; an inner cap having the tire pressure sensor and transmitter means encased in the inner cap and operatively screwed to the tire valve; an outer sleeve free rotatably engaged with the inner cap having low friction in between the inner cap and the outer sleeve; and a key device for unscrewing the inner cap from the tire valve or for screwing the cap to the valve; whereby after tightly screwing of the inner cap with the tire valve, a rotation of the outer sleeve will not rotate the inner cap when intended to unscrew the inner cap to steal the sensor and transmitter means because of the free rotatable engagement between the outer sleeve and the inner cap.

2. An apparatus according to claim 1, wherein said outré sleeve has an outside diameter generally equal to an outside diameter of an outer protective cylinder fixed and disposed around the tire valve, thereby providing no space or recess portion for grasping the inner cap by an intruder trying to unlock the cap, and ensuring a safe locking of the inner cap on the tire valve.

3. An apparatus according to claim 1, wherein said tire pressure sensor and transmitter means includes: a sensor having an actuator operatively depressing an inflation valve of the tire valve for leading air from a car tire into the sensor through a plurality of perforations formed through the actuator for sensing the tire pressure in the car tire, a transmitter processing a tire pressure signal as sensed by the sensor and remotely transmitting the signal to a tire pressure receiver, through an antenna, and at least a battery stored in the inner cap for powering the tire pressure sensor and transmitter means.

4. An apparatus according to claim 3, wherein said sensor and transmitter means includes an electronic circuit formed on a circuit board which is formed within an annular interior defined between the inner cap and the tire valve.

5. An apparatus according to claim 3, wherein said actuator of the sensor includes a packing member circumferentially formed on the actuator to be well sealed on a valve seat of the tire valve, with a female-threaded socket of the inner cap engaged with a male-threaded portion of the valve seat, and a spring resiliently retained in between the packing member and a bottom portion of the valve seat to normally urge the actuator outwardly to be slightly separated from the inflation valve to prevent from air leakage from a car tire when the actuator of the sensor is not tightly depressing the inflation valve.

6. An apparatus according to claim 1, wherein said inner cap includes: a cylindrical wall, a female-threaded socket circumferentially connected to the cylindrical wall and engaged with a male-threaded portion of the valve seat of the tire valve, a top cover secured on a top periphery of the cylindrical wall having a key recess recessed in an upper surface of the top cover adapted to be engaged with said key device for screwing the inner cap with the tire valve or for unscrewing the cap from the tire valve, and a bottom cover secured to a bottom periphery of the cylindrical wall; with the outer sleeve free rotatably engaged with the cylindrical wall, as rotatably slidably limited between the top cover and the bottom cover.

7. An apparatus according to claim 6, wherein said outer sleeve includes an upper groove annularly formed in an upper rim of the outer sleeve to be rotatably slidably engaged with an upper annular ring circumferentially formed on the top cover, and a lower groove annularly formed in a lower rim of the outer sleeve to be rotatably slidably engaged with a bottom annular ring circumferentially formed on the bottom cover; both the upper annular ring of the top cover and the lower annular ring of the bottom cover slidably shielded by the upper rim and bottom rim of the sleeve so that the intruder will have no way to grasp, hold or rotate the inner cap as concealed within the outer sleeve, thereby safely locking the inner cap and the sensor and transmitter means on the tire valve.

8. An apparatus according to claim 1, wherein said key device includes: a stem, a first key formed on a bottom portion of the stem and engaged with a key recess formed in a top cover of the inner cap for driving the top cover and the inner cap for locking or unlocking the inner cap on or from the valve seat of the tire valve, and a handle transversely formed on a knob which is formed on an upper portion of the stem for rotating or driving the stem for locking or unlocking operation.

9. An apparatus according to claim 8, wherein said first key is formed as an irregular-shaped protrusion protruding downwardly from the stem including a plum flower shaped protrusion.

10. An apparatus according to claim 8, wherein said key device further includes a second key protruded from an adapter formed on the knob and provided for driving at least a screw for fastening or unfastening a bottom cover or a top cover with or from a cylindrical wall of the inner cap; with the adapter engaged with a cavity recessed in the stem for normally storing the second key within the cavity in the stem.

11. An anti-steal tire pressure monitoring apparatus comprising: an inner cap connected to a valve seat of a tire valve; a tire pressure sensor and transmitter means encased in the inner cap and connected to an inflation valve of the tire valve for sensing tire pressure; and a set screw rotatably engaged with a female-threaded screw hole formed through a cylindrical wall of the inner cap; whereby when it is intended for locking the sensor and transmitter means and the cap on the tire valve, the set screw is screwed inwardly to be dogged with a female-threaded portion of the valve seat of the tire valve for locking the inner cap with the tire valve to prevent from unexpected stealing or removal of the sensor and transmitter means from the tire valve.

* * * * *